(12) United States Patent
Caruso et al.

(10) Patent No.: US 10,151,297 B2
(45) Date of Patent: Dec. 11, 2018

(54) METHODS FOR JOINING SHEAR CLIPS IN WIND TURBINE ROTOR BLADES

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 530 days.

(21) Appl. No.: 14/852,932

(22) Filed: Sep. 14, 2015

(65) Prior Publication Data

US 2017/0074240 A1    Mar. 16, 2017

(51) Int. Cl.
*F03D 1/06* (2006.01)
(52) U.S. Cl.
CPC ........ *F03D 1/0675* (2013.01); *F05B 2230/60* (2013.01)
(58) Field of Classification Search
CPC .... F03D 1/0675; F03D 13/10; F05B 2230/60; F05B 2230/234
See application file for complete search history.

(56) References Cited

U.S. PATENT DOCUMENTS

| | | | |
|---|---|---|---|
| 6,264,877 B1 | 7/2001 | Pallu De La Barriere | |
| 8,317,479 B2 | 11/2012 | Vronsky et al. | |
| 8,657,581 B2 | 2/2014 | Pilpel et al. | |
| 8,673,106 B1 | 3/2014 | Jolley et al. | |
| 8,747,098 B1 | 6/2014 | Johnson et al. | |
| 8,961,142 B2 | 2/2015 | Wansink | |
| 8,992,813 B2 | 3/2015 | Robbins et al. | |

(Continued)

FOREIGN PATENT DOCUMENTS

| | | |
|---|---|---|
| CN | 101906251 | 8/2010 |
| JP | 2007-92716 | 4/2007 |

(Continued)

OTHER PUBLICATIONS

Teuwen, et al.; "Vacuum Infused Thermoplastic Composites for Wind Turbine Blades," 2008 Wind Turbine Blade Workshop, Sandia National Laboratories—Presentation—May 12-14, 2008: (22 pages).

*Primary Examiner* — Richard A Edgar
*Assistant Examiner* — Danielle M. Christensen
(74) *Attorney, Agent, or Firm* — Dority & Manning, PA (57) ABSTRACT

Rotor blades and methods for joining shear clips in wind turbine rotor blades are provided. A method includes positioning the shear clip adjacent a shear web of the rotor blade, the shear clip including a thermoplastic resin, the shear web including a thermoplastic resin. The method further includes welding the thermoplastic resin of the shear clip and the thermoplastic resin of the shear web together. The method further includes positioning the shear clip adjacent a spar cap of the rotor blade, the spar cap including a thermoplastic resin. The method further includes welding the thermoplastic resin of the shear clip and the thermoplastic resin of the spar cap together. The method further includes joining the shear web and the spar cap together.

17 Claims, 8 Drawing Sheets

(56) References Cited

U.S. PATENT DOCUMENTS

| | | | |
|---|---|---|---|
| 2006/0027314 A1* | 2/2006 | Jones | B29C 33/10 |
| | | | 156/245 |
| 2009/0148300 A1 | 6/2009 | Driver et al. | |
| 2010/0062238 A1* | 3/2010 | Doyle | B29C 70/02 |
| | | | 428/295.1 |
| 2010/0143146 A1* | 6/2010 | Bell | F03D 1/06 |
| | | | 416/233 |
| 2011/0097211 A1 | 4/2011 | Rudling | |
| 2012/0027613 A1* | 2/2012 | Yarbrough | F03D 1/065 |
| | | | 416/226 |
| 2012/0195764 A1* | 8/2012 | Fuglsang | F03D 1/0641 |
| | | | 416/223 R |
| 2013/0164133 A1 | 6/2013 | Grove-Nielsen | |
| 2014/0295187 A1 | 10/2014 | Jacobsen et al. | |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

* cited by examiner

METHODS FOR JOINING SHEAR CLIPS IN WIND TURBINE ROTOR BLADES

FIELD OF THE INVENTION

The present disclosure relates generally to wind turbine rotor blades, and more particularly to methods for joining shear clips in wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin.

Such rotor blades, however, are not without issues. For example, the bond lines of typical rotor blades are generally formed by applying a suitable bonding paste or compound along the bond line with a minimum designed bond width between the shell members. These bonding lines are a critical design constraint of the blades as a significant number of turbine blade field failures occur at the bond-line. Separation of the bond line along the leading and/or trailing edges of an operational turbine blade can result in a catastrophic failure and damage to the wind turbine.

One particular issue that has arisen involves the connection of shear clips to shear webs and spar caps in rotor blades. Shear clips are generally utilized to reinforce the interface between the shear web and spar caps, and are connected to both such components at the shear web-spar cap interface. Because thermoset resins are generally utilized to form such rotor blades, thermoset-based joining techniques such as the application of bonding pastes or hand lay-ups must be utilized to the shear clips to the shear webs and spar caps. It can thus be difficult and time-consuming to join shear clips in rotor blades. Further, in many cases, the shear clips may not completely align with the neighboring shear web and/or spar cap surfaces, due to misalignments and manufacturing tolerances when connecting the shear web and spar caps. Accordingly, the resulting joints between the shear clips and the shear webs and spar caps may be sub-optimal.

Accordingly, improved methods for joining shear clips in wind turbine rotor blades would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for joining a shear clip in a wind turbine rotor blade is provided. The method includes positioning the shear clip adjacent a shear web of the rotor blade, the shear clip including a thermoplastic resin, the shear web including a thermoplastic resin. The method further includes welding the thermoplastic resin of the shear clip and the thermoplastic resin of the shear web together. The method further includes positioning the shear clip adjacent a spar cap of the rotor blade, the spar cap including a thermoplastic resin. The method further includes welding the thermoplastic resin of the shear clip and the thermoplastic resin of the spar cap together. The method further includes joining the shear web and the spar cap together.

In accordance with another embodiment, a rotor blade for a wind turbine is provided. The rotor blade includes a plurality of blade components joined together to form an exterior surface defining a pressure side, a suction side, a leading edge, and a trailing edge each extending between a tip and a root. The rotor blade further includes a shear web disposed within an interior defined by the plurality of blade components, the shear web including a thermoplastic resin, and a spar cap connected to the shear web, the spar cap including a thermoplastic resin. The rotor blade further includes a shear clip comprising a thermoplastic resin, the shear clip joined to the shear web and the spar cap by welded interfaces between the thermoplastic resin of the shear clip, the thermoplastic resin of the shear web and the thermoplastic resin of the spar cap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
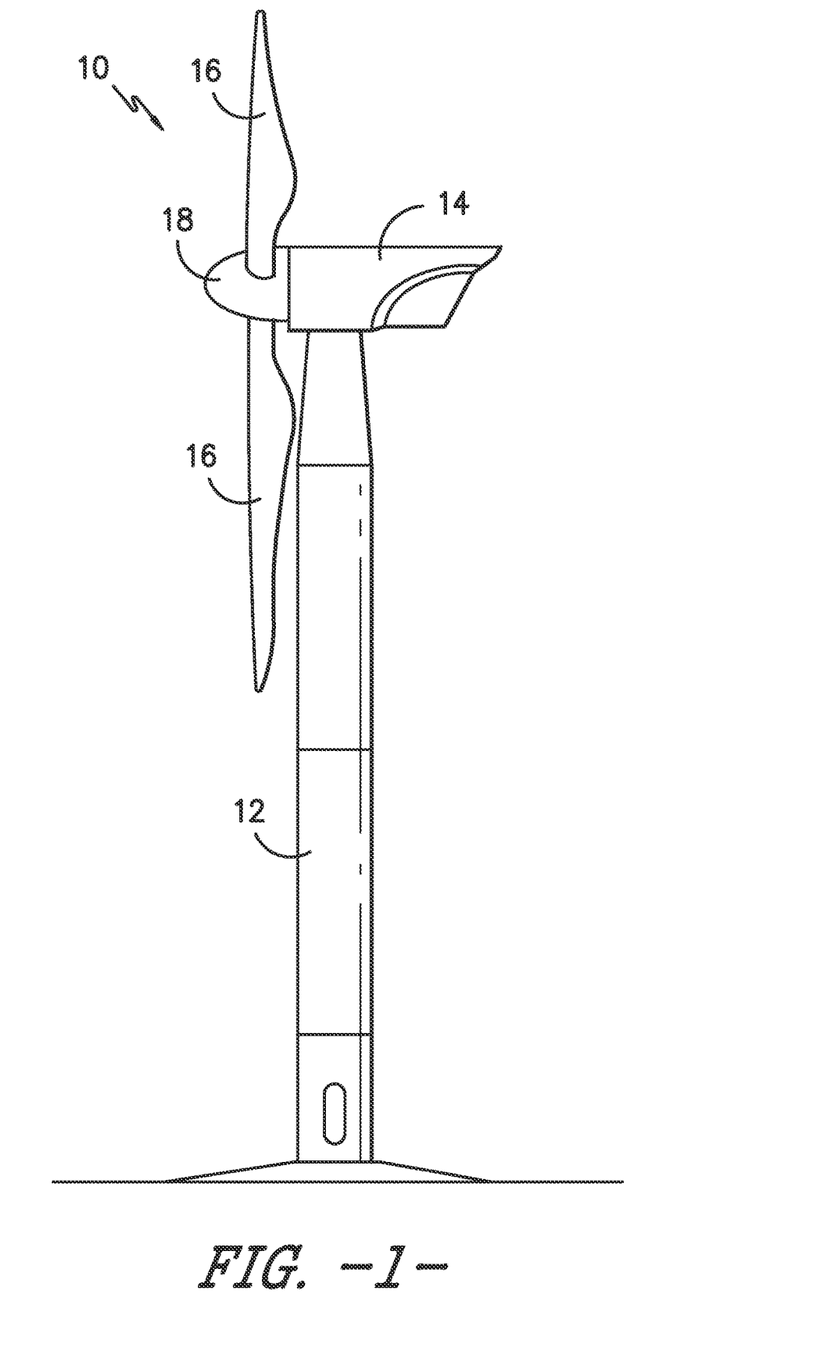
FIG. 1 is a perspective view of a wind turbine in accordance with one embodiment of the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The rotor blades 16 are considered to be uptower due to being erected on the tower 12 and wind turbine 10 generally. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Figure 2:
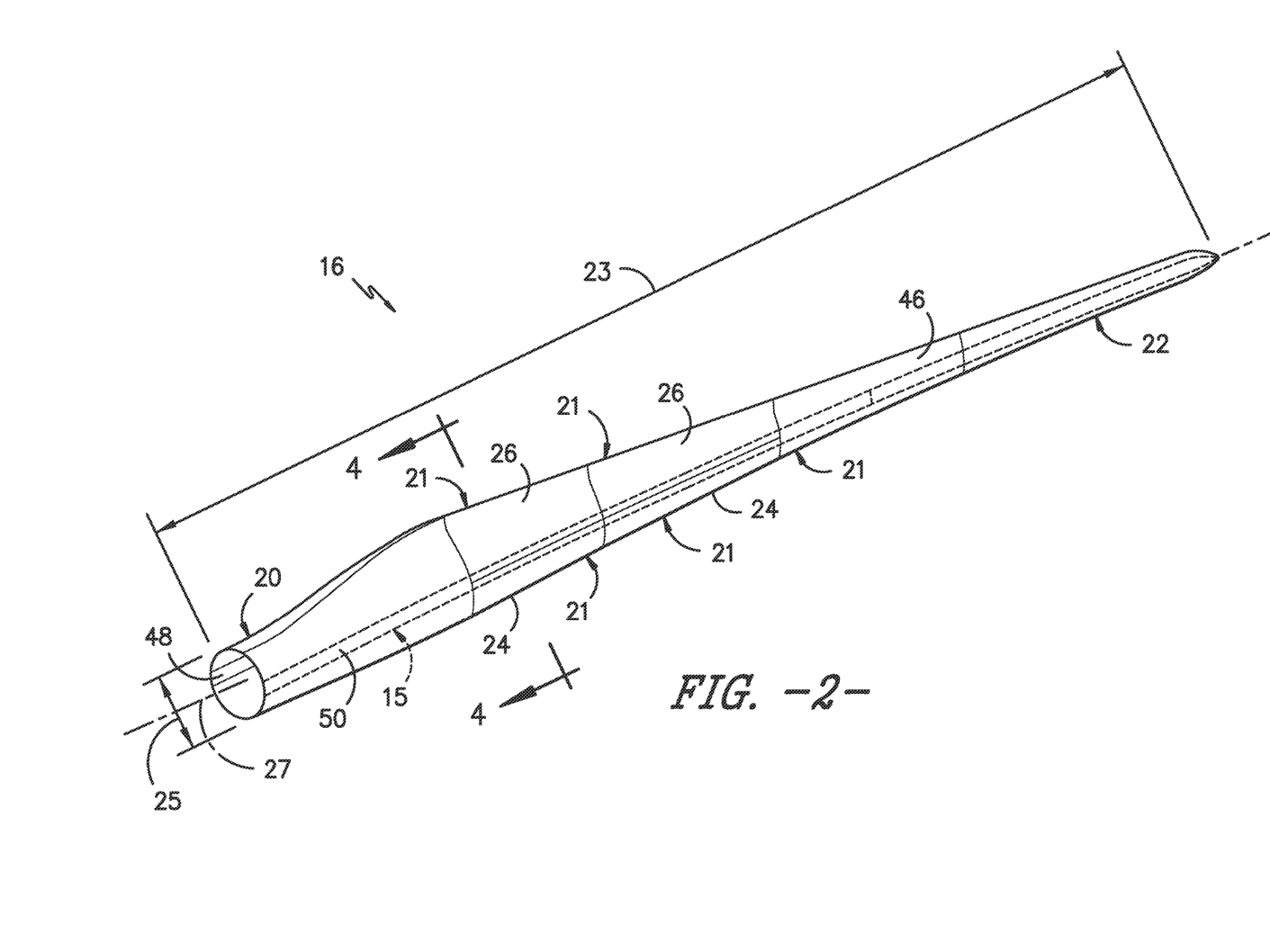
FIG. 2 is a perspective view of a formed rotor blade in accordance with one embodiment of the present disclosure.
Figure 3:
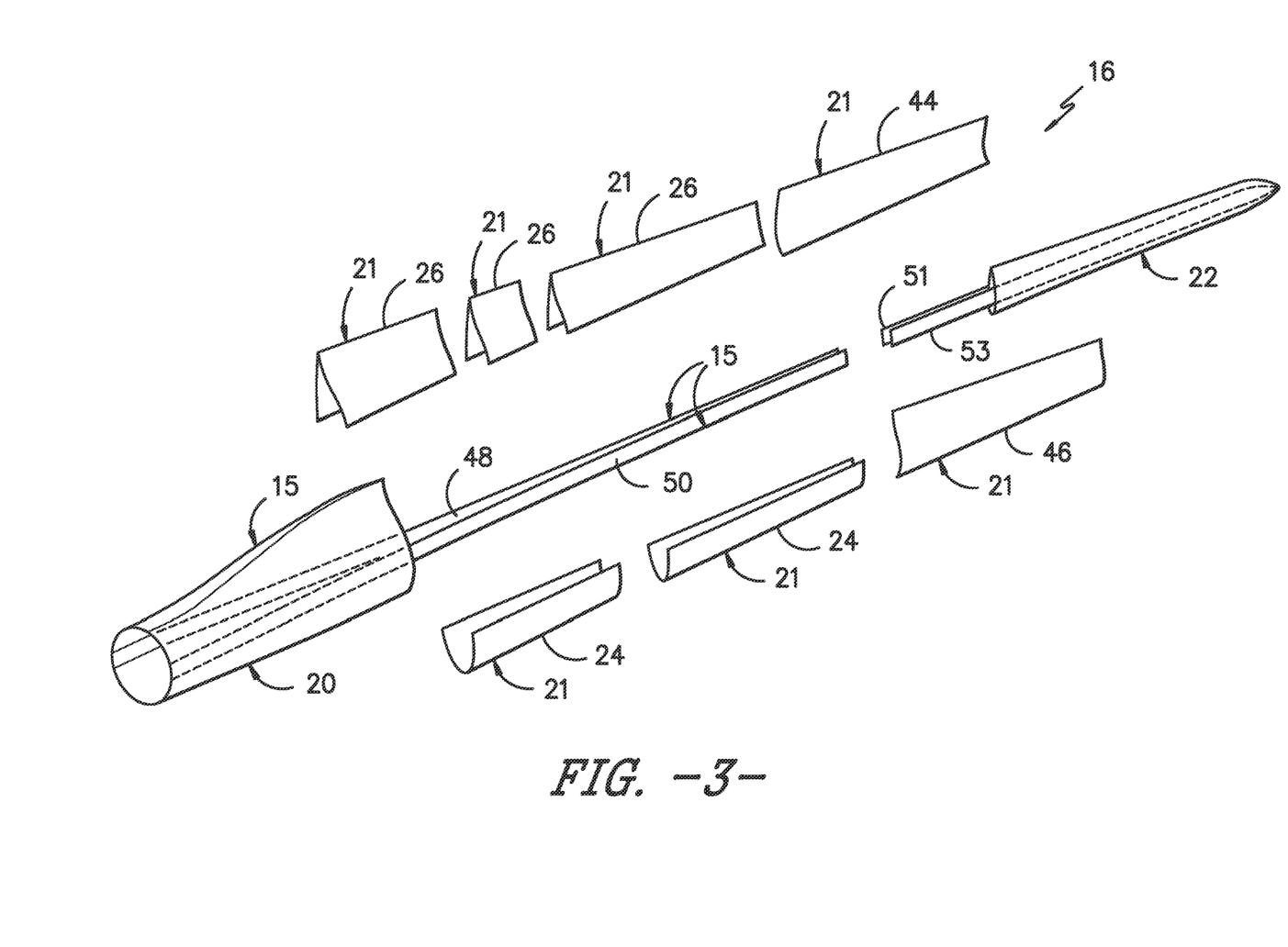
FIG. 3 is an exploded view of the rotor blade of FIG. 2.
Figure 6:
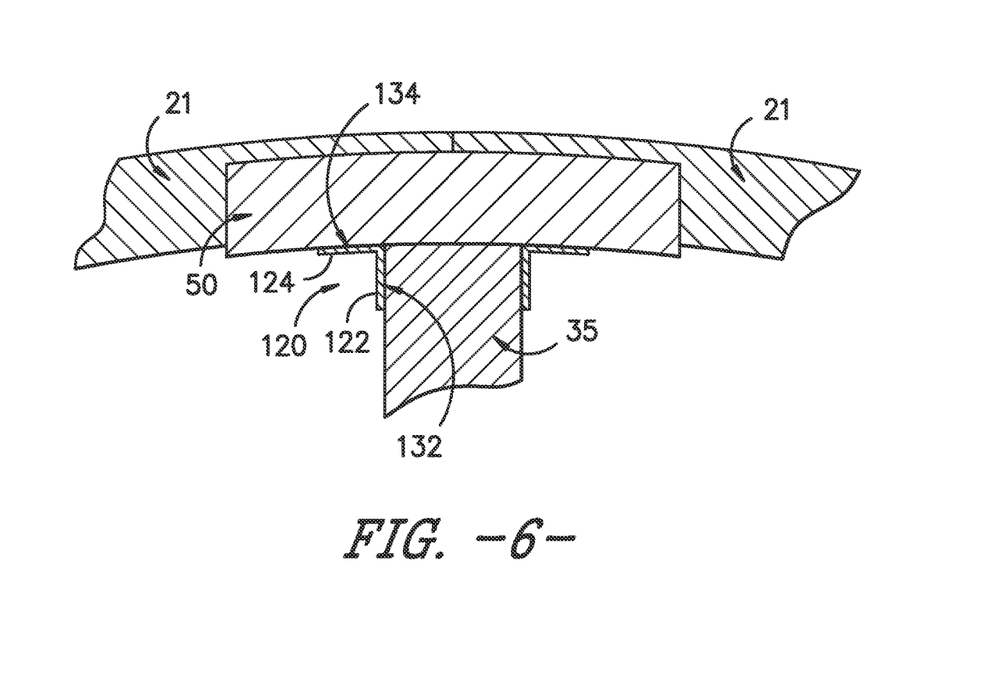
FIG. 6 is a perspective view of a connection between a shear web and a spar cap, including shear clips joined to the shear web and spar cap, in accordance with one embodiment of the present disclosure.

Referring now to FIGS. 2, 3 and 6, various views of rotor blades 16 according to the present disclosure are illustrated. As is generally understood, a rotor blade 16 according to the present disclosure may include an exterior surface 60 defining a pressure side 62, a suction side 64, a leading edge 66, and a trailing edge 68. The pressure side 62 and suction side 64 may each extend between the leading edge 66 and the trailing edge 68. The exterior surface 60 may extend between a blade tip 72 and a blade root 74 in a generally span-wise direction, as discussed below.

The pressure side, suction side, leading edge and trailing edge may be generally aerodynamic surfaces having generally aerodynamic contours, as is generally known in the art. Thus, the exterior surface of the rotor blade 16 may define an aerodynamic profile, such as an airfoil-like cross-sectional profile, for the rotor blade 16. The aerodynamic profile includes the pressure side, suction side, leading edge and trailing edge.

The rotor blade 16 may, in some embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 23 and a span 25 extending in chord-wise and span-wise directions, respectively. The chord may vary throughout the span of the rotor blade 16. Thus, a local chord may be defined for the rotor blade 16 at any point on the rotor blade 16 along the span.

Additionally, as shown in FIGS. 2, 3 and 6, the rotor blade 16 may define an inboard portion 82 and an outboard portion 84. The inboard portion may be a span-wise portion of the rotor blade 16 extending from the root. For example, the inboard portion may, in some embodiments, include approximately 33%, 40%, 50%, 60%, 67%, or any percentage or range of percentages therebetween, or any other suitable percentage or range of percentages, of the span from the root. The outboard portion may be a span-wise portion of the rotor blade 16 extending from the tip, and may in some embodiments include the remaining portion of the rotor blade 16 between the inboard portion and the tip. Additionally or alternatively, the outboard portion may, in some embodiments, include approximately 33%, 40%, 50%, 60%, 67%, or any percentage or range of percentages therebetween, or any other suitable percentage or range of percentages, of the span from the tip.

As shown in FIGS. 2 and 3, a rotor blade 16 in accordance with the present disclosure includes a main blade structure 15 constructed, at least in part, from a thermoset or a thermoplastic resin and at least one outer blade segment 21 configured with the main blade structure 15. More specifically, as shown, the rotor blade 16 includes a plurality of outer blade segments 21. The blade segment(s) 21 may also be constructed, at least in part, from a thermoset or a thermoplastic resin. The thermoplastic and/or the thermoset resin as described herein may optionally be reinforced with a fiber material, including but not limited to glass fibers, carbon fibers, metal fibers, or similar or combinations thereof, embedded in the resin to form a composite. Continuous or discontinuous fibers may be utilized. In exemplary embodiments, continuous fibers are utilized. The direction of the fibers may include biaxial, unidirectional, triaxial, or any other another suitable direction and/or combinations thereof. Further, the fiber content within a composite may vary depending on the stiffness required in the corresponding blade component, the region or location of the blade component in the rotor blade 16, and/or the desired weldability of the component.

More specifically, as shown, the main blade structure 15 may include any one of or a combination of the following:

a pre-formed blade root section 20, a pre-formed blade tip section 22, one or more one or more continuous spar caps 48, 50, 51, 53, one or more shear webs 35 (FIG. 4), and/or any other suitable structural component of the rotor blade 16. Further, the blade root section 20 is configured to be mounted or otherwise secured to the rotor 18 (FIG. 1). As mentioned, the rotor blade 16 defines a span 23 that is equal to the total length between the blade root section 20 and the blade tip section 22. The rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

In some embodiments, as shown in FIGS. 2-3, the main blade structure 15 may include the blade root section 20 with one or more longitudinally extending spar caps 48, 50 infused therewith. For example, the blade root section 20 52 may be configured according to U.S. application Ser. No. 14/753,155 filed Jun. 29, 2015 entitled "Blade Root Section for a Modular Rotor Blade and Method of Manufacturing Same" which is incorporated by reference herein in its entirety. Similarly, the main blade structure 15 may include the blade tip section 22 with one or more longitudinally extending spar caps 51, 53 infused therewith. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof.

Figure 4:
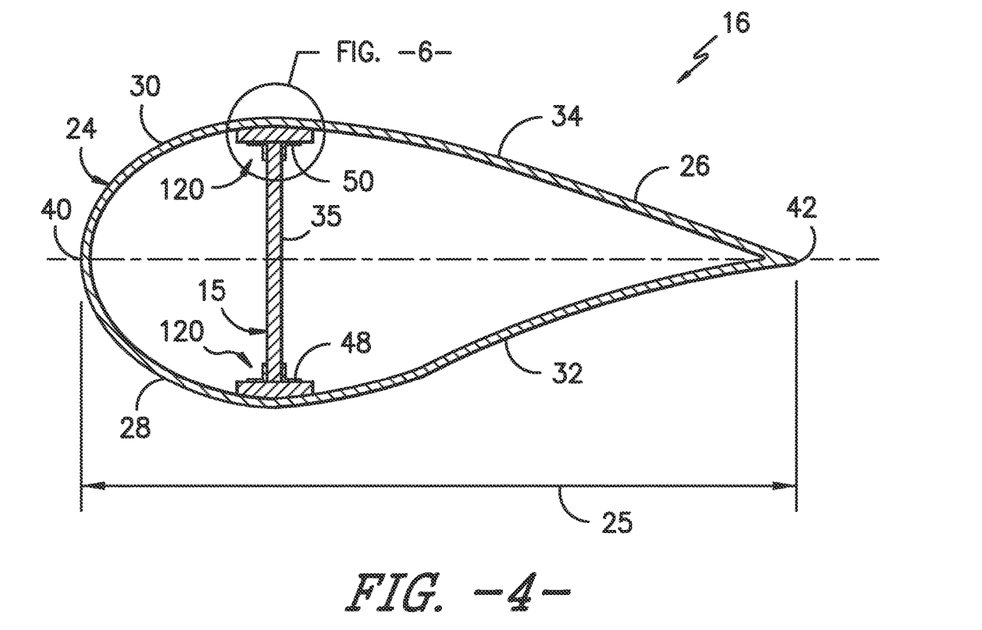
FIG. 4 is a cross-sectional view, along the line 4-4 of FIG. 2, of a rotor blade in accordance with one embodiment of the present disclosure.

In addition, as shown in FIG. 4, the main blade structure 15 may include one or more shear webs 35 configured between the one or more spar caps 48, 50, 51, 53. More particularly, the shear web(s) 35 may be configured to increase the rigidity in the blade root section 20 and/or the blade tip section 22.

Referring to FIGS. 2-4, any number of outer blade segments 21 having any suitable size and/or shape may be generally arranged between the blade root section 20 and the blade tip section 22 along a longitudinal axis 27 in a generally span-wise direction. The blade segments 21 generally serve as the outer casing/covering of at least a portion of the rotor blade 16 (such as between the blade root section 20 and the blade tip section 22) and may define a generally aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. As mentioned, the blade segments 21 may be constructed of any suitable materials, including but not limited to a thermoset material or a thermoplastic material optionally reinforced with one or more fiber materials. More specifically, as generally shown in the figures, the blade segments 21 may include any one of or combination of the following blade segments: pressure side segments, suction side segments 46, leading edge segments 24 and/or trailing edge segments 26.

More specifically, as shown in FIG. 4, the leading edge segments 24 may have a forward pressure side surface 28 and a forward suction side surface 30. Similarly, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16.

As discussed, the various blade components of the rotor blade 16, such as the main blade structure 15 and/or the various blade segments 21, may include a thermoset resin and/or a thermoplastic resin. Thermoplastic resins as described herein generally encompass a plastic material or polymer that is reversible in nature. For example, thermoplastic resins typically become pliable or moldable when heated to a certain temperature and return to a more rigid, solidified state upon cooling. Further, thermoplastic resins may include amorphous thermoplastic resins and/or semi-crystalline thermoplastic resins. For example, some amorphous thermoplastic resins may generally include, but are not limited to styrenes, vinyls, cellulosics, polyesters, acrylics, polysulphones, and/or imides. More specifically, example amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, example semi-crystalline thermoplastic resins may generally include, but are not limited to, polyolefins, polyamides, fluropolymers, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. The thermoset resins as described herein generally encompass a plastic material or polymer that is non-reversible in nature. For example, thermoset resins, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset materials.

Figure 5:
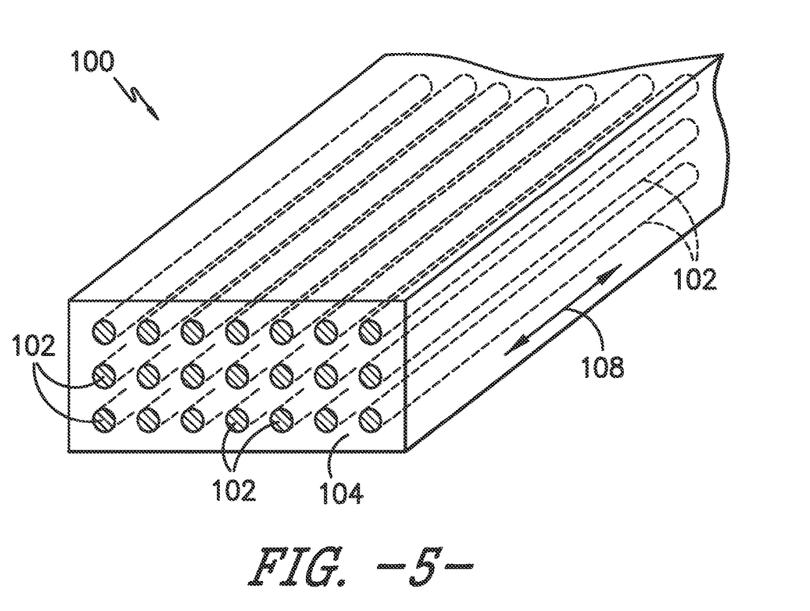
FIG. 5 is a perspective view of a portion of a composite utilized in various components of a rotor blade assembly in accordance with one embodiment of the present disclosure.

Referring briefly to FIG. 5, an embodiment of a composite 100 utilized in accordance with the present disclosure is provided. As illustrated, the composite 100 generally includes a resin 102 (which may be a thermoset or thermoplastic) and a plurality of fibers 104 embedded therein. In exemplary embodiments the fibers 104 are continuous, generally unidirectional fibers which extend along a longitudinal axis 108 as illustrated. Alternatively, discontinuous fibers may be utilized, and/or the fibers may extend at any suitable angles.

Referring now to FIGS. 6 through 11, the present disclosure is further directed to methods 200 for joining shear clips 120 in rotor blades 16, i.e. to shear webs 35 and spar caps 48, 50, 51, 53. It should be understood while the present disclosure discusses various embodiments for shear clips 120 being joined to spar caps 50, such embodiments may equally be applied to spar caps 48, 51 and/or 53.

Figure 7:
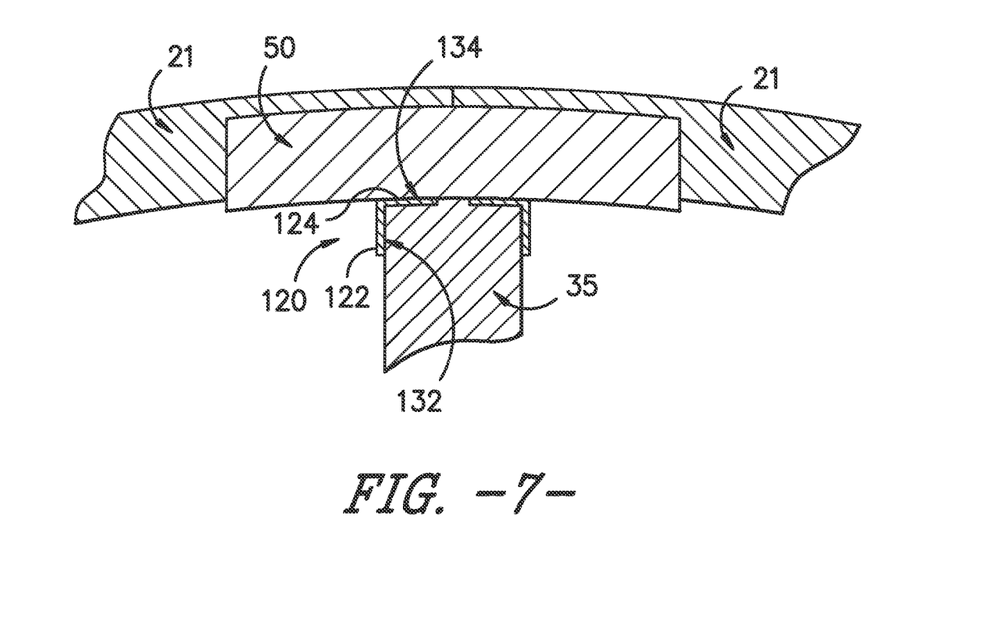
FIG. 7 is a perspective view of a connection between a shear web and a spar cap, including shear clips joined to the shear web and spar cap, in accordance with another embodiment of the present disclosure.
Figure 8:
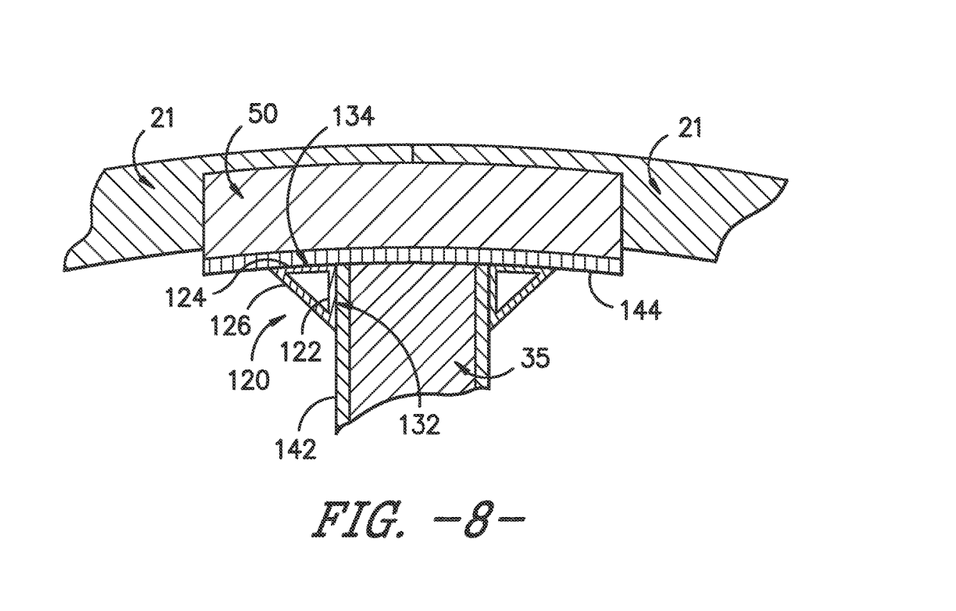
FIG. 8 is a perspective view of a connection between a shear web and a spar cap, including shear clips joined to the shear web and spar cap, in accordance with one embodiment of the present disclosure.

A shear clip 120 is generally a component which is joined to a shear web 35 and spar cap 50 at the interface between the shear web 35 and spar cap 50 to strengthen this interface and increase the rigidity of the resulting rotor blade 16. Accordingly, a shear clip 120 may include a first panel 122 that may be joined at least to the shear web 35 and a second panel 124 that may be joined at least to the spar cap 50. In exemplary embodiments, the first panel 122 and second panel 124 are provided in a generally L-shaped arrangement, as illustrated in FIGS. 6, 7, 9 and 10. In some embodiments, as illustrated in FIG. 8, a third panel 126 may extend between the first panel 122 and the second panel 124 such that the panels 122, 124, 126 are provided in a generally triangle-shaped arrangement.

In some embodiments, as illustrated in FIGS. 6 and 8-10, the first panel 122 may be joined to the shear web 35, such as to only the shear web 35, and the second panel 124 may be joined to the spar cap 50, such as to only the spar cap 50. In other embodiments, as illustrated in FIG. 7, the first panel 122 may be joined to the shear web 35, such as to only the shear web 35, and the second panel 124 may be joined to the spar cap 50 and the shear web 35, and may for example be disposed between the spar cap 50 and the shear web 35. Interfaces 132, 134 may be defined at the joints between the shear clip 120 and the shear web 35 and between the shear clip 120 and the spar cap 50, respectively.

As discussed, the shear web 35 and spar cap 50 may include a thermoplastic resin. A shear web 35 and/or spar cap 50 may thus be formed at least partially from a thermoplastic resin. In some embodiments, the resin may be a neat resin which is free from fibers. In other embodiments, the shear web 35 and/or spar cap 50 may include fiber reinforced thermoplastic composites, which may include the thermoplastic resin and a plurality of fibers embedded in the thermoplastic resin as discussed herein.

Notably, a shear web 35 and/or spar cap 50 may in exemplary embodiments be formed from a plurality of layers, or plies. One or more of the plies may thus include the thermoplastic resin and/or composite as discussed.

In some embodiments, as illustrated in FIGS. 6, 7, 9 and 10, an entire shear web 35 and/or spar cap 50 may include the thermoplastic resin (and, optionally, composite including the thermoplastic resin and fibers). Alternatively, as illustrated in FIG. 8, only one or more localized portions 142, 144, respectively of a shear web 35 and/or spar cap 50 may include the thermoplastic resin (and, optionally, composite including the thermoplastic resin and fibers). For example, one or more localized portions 142, 144 may include the thermoplastic resin, while the remainder of a shear web 35 and/or spar cap 50 may include a thermoset resin (and, optionally, a composite which includes the thermoset resin and fibers embedded therein). In some embodiments, for example, a localized portion 142, 144 may be one or more of the plies forming the shear web 35 and/or spar cap 50. At least one localized portion 142, 144 may be a joint portion which is utilized to form a joint as discussed herein and thus is in contact with or adjacent to a shear clip 120 as discussed herein.

Further, a shear clip 120 in accordance with the present disclosure may include a thermoplastic resin. A shear clip 120 may thus be formed at least partially from a thermoplastic resin. In some embodiments, the resin may be a neat resin which is free from fibers. In other embodiments, the shear clip 120 may include fiber reinforced thermoplastic composites, which may include the thermoplastic resin and a plurality of fibers embedded in the thermoplastic resin as discussed herein.

Notably, in exemplary embodiments, the thermoplastic resin of the shear web 35 and/or spar cap 50 to which a shear clip 120 is to be joined may be the same as the thermoplastic resin of the shear clip 120. Alternatively, the thermoplastic resins may be different.

Figure 11:
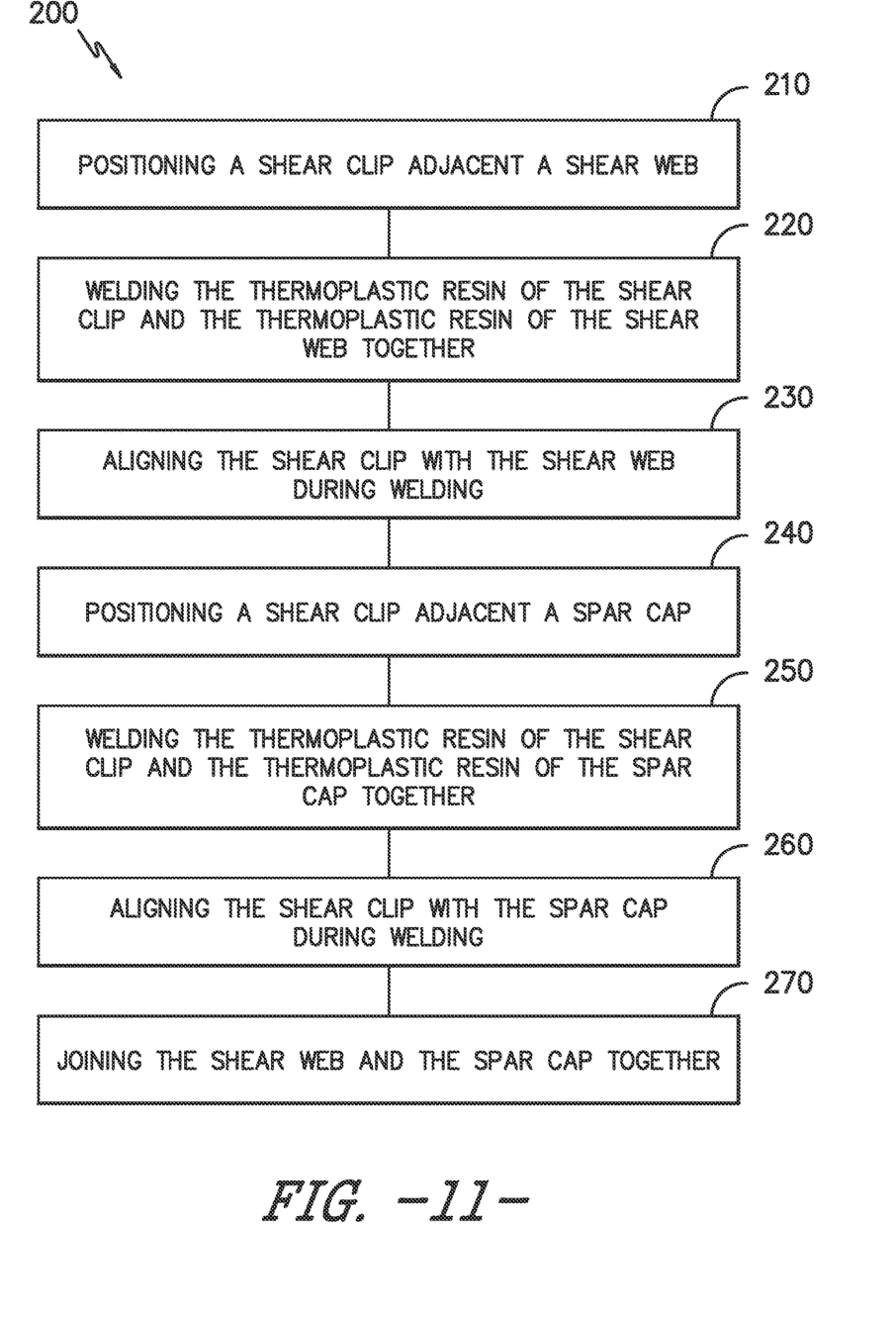
FIG. 11 is a flow chart illustrating a method for joining a shear clip in a rotor blade in accordance with one embodiment of the present disclosure.

Referring now also to FIG. 11 and in accordance with embodiments of method 200, and as illustrated as step 210, a shear clip 120 may be positioned adjacent to a shear web 35. In exemplary embodiments, the shear clip 120 may be positioned in contact with the shear web 35. Alternatively, an insert which may assist with joining may be disposed between and in contact with the shear clip 120 and shear web 35. The insert may, for example, include a thermoplastic resin. In some embodiments, the resin may be a neat resin which is free from fibers. In other embodiments, the insert may include a fiber reinforced thermoplastic composite, which may include the thermoplastic resin and a plurality of fibers embedded in the thermoplastic resin as discussed herein. Further, in some embodiments, an insert may include an energy absorptive pigment which may be dispersed within the resin. The energy absorptive pigment may assist in, for example, laser welding.

After the positioning step 210 and as illustrated as step 220, method 200 may further include welding the thermoplastic resin of the shear clip 120 and the thermoplastic resin of the shear web 35 together, such as at a joining location wherein the shear clip 120 is adjacent to (such as in contact with) the shear web 35. Any suitable welding process may be utilized to weld the thermoplastic resin of the shear clip 120 and the thermoplastic resin of the shear web 35 together. For example, suitable welding techniques may include resistive welding, hot gas welding, speed tip welding, extrusion welding, contact welding, hot plate welding, high frequency welding, induction welding, injection welding, ultrasonic welding, friction welding, laser welding, or solvent welding.

In exemplary embodiments, welding step 220 may include heating the thermoplastic resin of the shear clip 120 and the thermoplastic resin of the shear web 35, such as at the joining location. In some embodiments, a suitable heating element 150 may be utilized to heat the resins. The heating element may, for example, be a heat gun, laser, etc. Alternatively, heat may be generated via friction or another suitable method. The resins may for example, be heated to above the melting points of the resins in order to facilitate joining thereof.

Further, in exemplary embodiments, a compressive force 152 may be applied to the shear clip 120 and shear web 35, such as at the joining location. Such force 152 may be applied before, during and/or after heating to facilitate bonding at the weld interface 132 therebetween. Any suitable clamping mechanisms or other suitable apparatus may be utilized for providing a compressive force 152.

Further, in exemplary embodiments, the shear clip 120 and shear web 35, such as the thermoplastic resins thereof, may be cooled, such as after heating. Cooling allows the resins to re-solidify and the bonds between the shear clip 120 and shear web 35 to be completed at the interface 152. In some embodiments, cooling is performed by simply allowing the shear clip 120 and shear web 35 to rest in an ambient temperature environment. In other embodiments, suitable active cooling techniques utilizing cooled air or another suitable gas or liquid may be utilized.

In some embodiments, method 200 may further include the step 230 of aligning the shear clip 120 (such as the first panel 122 thereof) with the shear web 35. For example, it is generally desirable that the contacting surface of the shear clip 120, such as the first panel 122 thereof, is generally entirely flush and in contact with the shear web 35. Accordingly, the shear clip 120 may be aligned with the shear web 35 such that the shear clip 120, such as the first panel 122 thereof, is so oriented relative to the shear web 35. In exemplary embodiments, such step 230 may occur during the welding step 220. In particular, such step 230 may occur during the heating portion of the welding step 220, and may include deforming the shear clip 120. For example, and referring to FIG. 9, the orientation of the first panel 122 may be deformed to a desired orientation relative to the shear web 35. When the shear clip 120 has been sufficiently heated during the heating portion of the welding step 220, the first panel 122 can thus be bent from an original position (illustrated in dotted lines in FIG. 9) to a final position for joining to the shear web 35.

Figure 9:
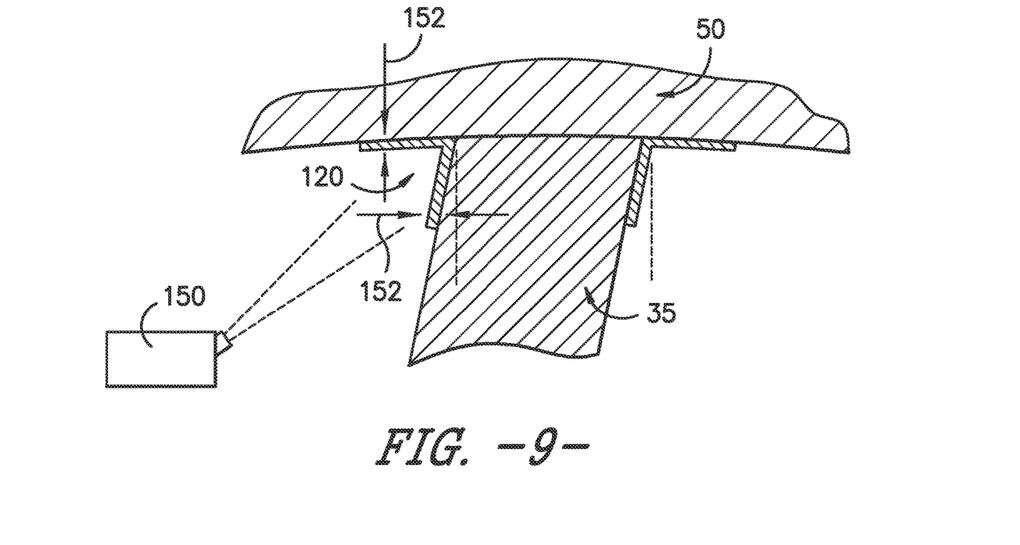
FIG. 9 is a schematic perspective view of a shear clip being joined to a shear web and spar cap in accordance with one embodiment of the present disclosure.

Such ability to deform and align the shear clip 120 in accordance with the present disclosure is particularly advantageous. For example, shear clips 120 may be supplied which all have generally the same orientation of the first and second panels 122, 124, i.e. having a 90 degree angle therebetween. These angles can then be modified to individually tailor the shear clips 120 to particular applications wherein a 90 degree angle is not defined at the shear web 35-spar cap 50 interface. Accordingly, manufacturing costs for the shear clips 120 may be reduced, as they can be mass produced instead of originally individually designed per application. Further, reinforcement of the shear web 35-spar cap 50 interface may be improved by the individually tailored alignment of the shear clip 120 on a per application basis.

Further, and in accordance with embodiments of method 200, and as illustrated as step 240, a shear clip 120 may be positioned adjacent to a spar cap 50. In exemplary embodiments, the shear clip 120 may be positioned in contact with the spar cap 50. Alternatively, an insert which may assist with joining may be disposed between and in contact with the shear clip 120 and spar cap 50. The insert may, for example, include a thermoplastic resin. In some embodiments, the resin may be a neat resin which is free from fibers. In other embodiments, the insert may include a fiber reinforced thermoplastic composite, which may include the thermoplastic resin and a plurality of fibers embedded in the thermoplastic resin as discussed herein. Further, in some embodiments, an insert may include an energy absorptive pigment which may be dispersed within the resin. The energy absorptive pigment may assist in, for example, laser welding.

After the positioning step 240 and as illustrated as step 250, method 200 may further include welding the thermoplastic resin of the shear clip 120 and the thermoplastic resin of the spar cap 50 together, such as at a joining location wherein the shear clip 120 is adjacent to (such as in contact with) the spar cap 50. Any suitable welding process may be utilized to weld the thermoplastic resin of the shear clip 120 and the thermoplastic resin of the spar cap 50 together. For example, suitable welding techniques may include hot gas welding, speed tip welding, extrusion welding, contact welding, hot plate welding, high frequency welding, induction welding, injection welding, ultrasonic welding, friction welding, laser welding, or solvent welding.

In exemplary embodiments, welding step 220 may include heating the thermoplastic resin of the shear clip 120 and the thermoplastic resin of the spar cap 50, such as at the joining location. In some embodiments, a suitable heating element 150 may be utilized to heat the resins. The heating element may, for example, be a heat gun, laser, etc. Alternatively, heat may be generated via friction or another suitable method. The resins may for example, be heated to above the melting points of the resins in order to facilitate joining thereof.

Further, in exemplary embodiments, a compressive force 152 may be applied to the shear clip 120 and spar cap 50, such as at the joining location. Such force 152 may be applied before, during and/or after heating to facilitate bonding at the weld interface 134 therebetween. Any suitable clamping mechanisms or other suitable apparatus may be utilized for providing a compressive force 152.

Further, in exemplary embodiments, the shear clip 120 and spar cap 50, such as the thermoplastic resins thereof, may be cooled, such as after heating. Cooling allows the resins to re-solidify and the bonds between the shear clip 120 and spar cap 50 to be completed at the interface 155. In some embodiments, cooling is performed by simply allowing the shear clip 120 and spar cap 50 to rest in an ambient temperature environment. In other embodiments, suitable active cooling techniques utilizing cooled air or another suitable gas or liquid may be utilized.

In some embodiments, method 200 may further include the step 260 of aligning the shear clip 120 (such as the second panel 124 thereof) with the spar cap 50. For example, it is generally desirable that the contacting surface of the shear clip 120, such as the second panel 124 thereof, is generally entirely flush and in contact with the spar cap 50. Accordingly, the shear clip 120 may be aligned with the spar cap 50 such that the shear clip 120, such as the second panel 124 thereof, is so oriented relative to the spar cap 50. In exemplary embodiments, such step 260 may occur during the welding step 250. In particular, such step 260 may occur during the heating portion of the welding step 250, and may include deforming the shear clip 120. For example, and referring to FIG. 10, the orientation of the second panel 124 may be deformed to a desired orientation relative to the spar cap 50. When the shear clip 120 has been sufficiently heated during the heating portion of the welding step 250, the second panel 124 can thus be bent from an original position (illustrated in dotted lines in FIG. 10) to a final position for joining to the spar cap 50.

Figure 10:
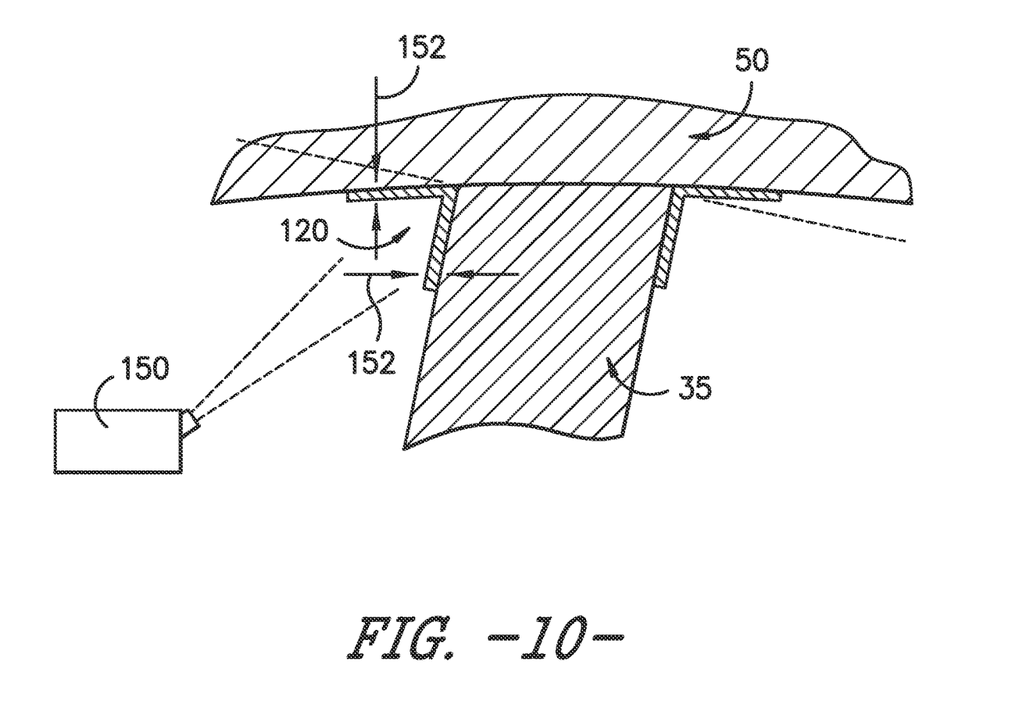
FIG. 10 is a schematic perspective view of a shear clip being joined to a shear web and spar cap in accordance with another embodiment of the present disclosure.

Such ability to deform and align the shear clip 120 in accordance with the present disclosure is particularly advantageous. For example, shear clips 120 may be supplied which all have generally the same orientation of the first and second panels 122, 124, i.e. having a 90 degree angle therebetween. These angles can then be modified to individually tailor the shear clips 120 to particular applications wherein a 90 degree angle is not defined at the shear web 35-spar cap 50 interface. Accordingly, manufacturing costs for the shear clips 120 may be reduced, as they can be mass produced instead of originally individually designed per application. Further, reinforcement of the shear web 35-spar cap 50 interface may be improved by the individually tailored alignment of the shear clip 120 on a per application basis.

Notably, in some embodiments positioning steps 210, 240 may occur generally simultaneously, and welding steps 220, 250 may occur generally simultaneously. In these embodiments, the shear web 35 and spar cap 50 are typically joined together before joining the shear clips 120 thereto. In other embodiments, the various steps may be performed sequentially, based on the order of joining the various components. For example, the shear clips 120 may first be joined to the shear web 35, and the shear clips 120 and shear web 35 may then be joined to the spar cap 50. Alternatively, the shear clips 120 may first be joined to the spar cap 50, and the shear clips 120 and spar cap 50 may then be joined to the shear web 35.

Accordingly, a method 200 may further include the step 270 of joining the shear web 35 and the spar cap 50 together. In exemplary embodiments, the joining step 270 includes welding the thermoplastic resin of the shear web 35 and the thermoplastic resin of the spar cap 50 together. Any suitable welding process may be utilized, and in exemplary embodiments such welding may include heating, compression, and cooling as discussed above with respect to the shear clips 120. Alternatively, other suitable methods, such as conventional lay-up or bonding paste based methods, may be utilized to join the shear web 35 and the spar cap 50 together.

In some embodiments, step 270 may occur before the positioning steps 210, 240 and the welding steps 220, 250. In other embodiments, the joining step 270 may occur after the positioning step 210 and the welding step 220, and for example before the positioning step 240 and welding step 250. In other embodiments, the joining step 270 may occur after the positioning step 240 and the welding step 250, and before the positioning step 210 and the welding step 220.

Methods for joining shear clips 120 to shear webs 35 and spar caps 50 in accordance with the present disclosure provide numerous advantages. In particular, such joining is advantageously efficient due to the use of thermoplastic materials, and the resulting joints are relatively stronger than joints that result from the use of materials such as thermosets.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for joining a shear clip in a wind turbine rotor blade, the method comprising:
   positioning the shear clip adjacent a shear web of the rotor blade, the shear clip comprising a thermoplastic resin, the shear web comprising a thermoset and a localized portion of a thermoplastic resin;
   welding the thermoplastic resin of the shear clip and the localized portion of the thermoplastic resin of the shear web together;
   positioning the shear clip adjacent a spar cap of the rotor blade, the spar cap comprising a thermoplastic resin;
   welding the thermoplastic resin of the shear clip and the thermoplastic resin of the spar cap together;
   deforming the shear clip when the shear clip is heated during at least one of welding of the shear clip and shear web together or welding the shear clip and spar cap together; and
   joining the shear web and the spar cap together.

2. The method of claim 1, wherein the joining step occurs before positioning the shear clip adjacent the shear web, positioning the shear clip adjacent the spar cap, welding of the shear clip and shear web together, and welding the shear clip and spar cap together.

3. The method of claim 1, wherein the joining step occurs after positioning the shear clip adjacent the shear web and welding the thermoplastic resin of the shear clip and the localized portion of the thermoplastic resin of the shear web together.

4. The method of claim 1, wherein the joining step occurs after positioning the shear clip adjacent the spar cap and welding the thermoplastic resin of the shear clip and the thermoplastic resin of the spar cap together.

5. The method of claim 1, wherein the step of welding the thermoplastic resin of the shear clip and the localized portion of the thermoplastic resin of the shear web together comprises:
   heating the thermoplastic resin of the shear clip and the localized portion of the thermoplastic resin of the shear web; and
   cooling the thermoplastic resin of the shear clip and the localized portion of the thermoplastic resin of the shear web.

6. The method of claim 1, wherein the step of welding the thermoplastic resin of the shear clip and the thermoplastic resin of the spar cap together comprises:
   heating the thermoplastic resin of the shear clip and the thermoplastic resin of the spar cap; and
   cooling the thermoplastic resin of the shear clip and the thermoplastic resin of the spar cap.

7. The method of claim 1, wherein the shear clip is positioned in contact with the shear web.

8. The method of claim 1, wherein the shear clip is positioned in contact with the spar cap.

9. The method of claim 1, wherein the entire spar cap comprises the thermoplastic resin.

10. The method of claim 1, wherein the shear web, the spar cap and the shear clip each comprises a fiber reinforced thermoplastic composite, the composite comprising the thermoplastic resin and a plurality of fibers embedded in the thermoplastic resin.

11. The method of claim 1, wherein the joining step comprises welding the localized portion of the thermoplastic resin of the shear web and the thermoplastic resin of the spar cap together.

12. The method of claim 1, further comprising aligning the shear clip with the shear web during welding of the thermoplastic resin of the shear clip and the localized portion of the thermoplastic resin of the shear web together.

13. The method of claim 12, wherein the aligning step comprises deforming the shear clip.

14. The method of claim 1, further comprising aligning the shear clip with the spar cap during welding of the thermoplastic resin of the shear clip and the thermoplastic resin of the spar cap together.

15. A rotor blade for a wind turbine, the rotor blade comprising:
   a plurality of blade components joined together to form an exterior surface defining a pressure side, a suction side, a leading edge, and a trailing edge each extending between a tip and a root;
   a shear web disposed within an interior defined by the plurality of blade components, the shear web comprising a thermoset and a localized portion of a thermoplastic resin;
   a spar cap connected to the shear web, the spar cap comprising a comprising a thermoset and a localized portion of thermoplastic resin; and
   a shear clip comprising a thermoplastic resin, the shear clip joined to the shear web and the spar cap by welded interfaces between the thermoplastic resin of the shear clip, the localized portion of the thermoplastic resin of the shear web and the localized portion of the thermoplastic resin of the spar cap.

16. The rotor blade of claim 15, wherein the shear web, the spar cap and the shear clip each comprises a fiber reinforced thermoplastic composite, the composite comprising the thermoplastic resin and a plurality of fibers embedded in the thermoplastic resin.

17. A rotor blade for a wind turbine, the rotor blade comprising:
- a plurality of blade components joined together to form an exterior surface defining a pressure side, a suction side, a leading edge, and a trailing edge each extending between a tip and a root;
- a shear web disposed within an interior defined by the plurality of blade components;
- the shear web comprising a thermoplastic resin; as spar cap connected to the shear web, the spar cap comprising a thermoset and a localized portion of thermoplastic resin; and
- a shear clip comprising a thermoplastic resin, the shear clip joined to the shear web and the spar cap by welded interfaces between the thermoplastic resin of the shear clip, the thermoplastic resin of the shear web, and the localized portion of the thermoplastic resin of the spar cap.

* * * * *